F. L. ORDWAY.
COMBINED ANTISWAYING AND SPRING GUARD DEVICE FOR AUTOMOBILES.
APPLICATION FILED AUG. 4, 1916.
1,212,666.
Patented Jan. 16, 1917.
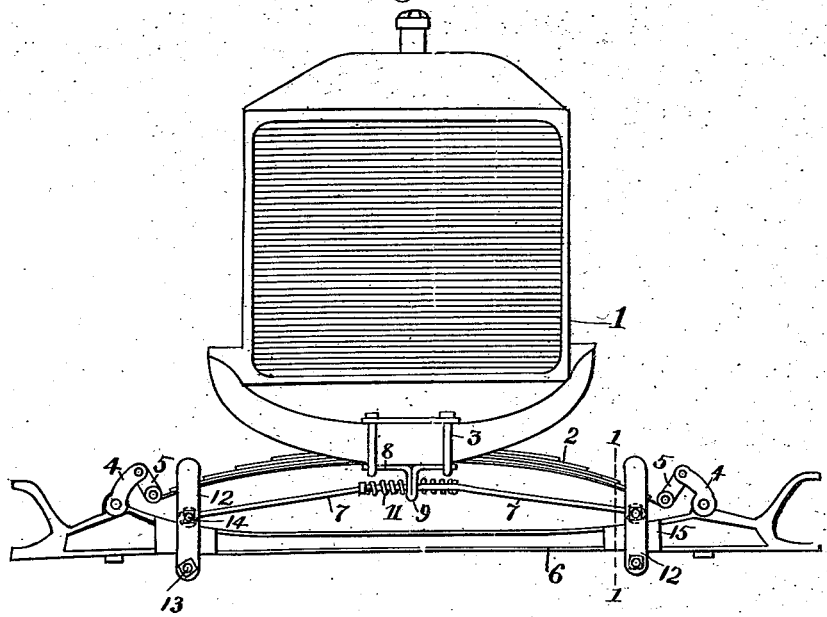
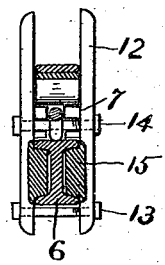
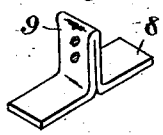
Inventor:
Fred L. Ordway
by S. W. Bates
Atty.

UNITED STATES PATENT OFFICE.

FRED L. ORDWAY, OF OLD ORCHARD, MAINE, ASSIGNOR OF ONE-HALF TO LOUIS MANSEY, OF OLD ORCHARD, MAINE.

COMBINED ANTISWAYING AND SPRING-GUARD DEVICE FOR AUTOMOBILES.

1,212,666.      Specification of Letters Patent.      Patented Jan. 16, 1917.

Application filed August 4, 1916. Serial No. 113,050.

*To all whom it may concern:*

Be it known that I, FRED L. ORDWAY, a citizen of the United States, residing at Old Orchard, in the county of Cumberland and State of Maine, have invented certain new and useful Improvements in Combined Antiswaying and Spring-Guard Devices for Automobiles, of which the following is a specification.

My invention relates to a device to be applied to an automobile of the "Ford" type in which the semi-elliptical springs extend laterally across the ends and are supported directly over the axles.

In the "Ford" automobile the ends of the forward spring to which my invention is particularly applicable are supported by short links or shackles which hang from and are pivoted to the upper ends of the perches or standards, these perches being bolted to the axle. When the machine is new and the springs are in their normal position, the shackle hangs from the perch in an inwardly inclined position making an angle of about 45 degrees with the horizon. Thus when a lateral motion or sway is given to the body of the car or to the spring, the ends of the spring being hung from the inclined links are able to resist the lateral motion because such a motion will cause one or the other of the ends of the spring to lift against the weight of the car body. Accordingly there is in the new car comparatively little lateral swaying motion and the cars tend to ride with relative steadiness. When, however, the springs wear and bend, their supporting ends tend to separate, bringing the shackles in a more or less vertical position. When in this position the lateral vibration of the spring and car body will not be checked as the shackles will swing horizontally with no tendency to lift the car and the swaying tendency of the car will be much accentuated. The effect of this free lateral swaying or vibration of the body and spring with respect to the axle has a very marked effect on the steering of the car. As is well known the steering post is rigidly attached to the body of the car and the steering gear is attached to the axle so that any lateral motion between the two will tend to disturb and render unsteady the operation of steering the car. Again, when the front spring happens to break one end will drop down and slipping from the axle will tend to overturn the body of the car.

The objects of my invention are two-fold, first to provide a simple device which may be easily applied to Ford machines for the prevention of lateral vibration of the body relative to the axle and second, to combine this with a guide for the spring whereby the spring is guided and held in place after it breaks so that no serious accident will occur even after the spring breaks. These objects are carried out by providing a pair of rods which extend from a clip attached to the central portion of the spring to each end of the axle, these rods being provided with coil springs which resist the tendency of the car body and the spring to lateral vibration or movement. The outer ends of these rods are attached near the ends of the axle by two part clamps which while holding the outer ends of the brace rods, project up on each side of the springs loosely inclosing the springs and guiding them if they break onto a bearing on the axle.

My invention may best be understood by reference to the accompanying drawing in which is shown my invention as applied to a Ford car.

In the drawing, Figure 1 is a front elevation of a Ford machine with my antiswaying and spring guide device shown in position, Fig. 2 is a section on the line 1—1 of Fig. 1 and Fig. 3 is a perspective of the auxiliary clip.

In the drawing 1 is an elevation of the front portion of a Ford car, 2 is the front spring, 3 is the front spring clip, 4 is the perch, 5 is the spring shackle and 6 is the front axle.

In carrying out my invention, I provide a pair of brace rods 7, 7, which connect the center of the spring with the ends of the axle with a resilient connection so as to check the swaying of the body. The inner ends of these brace rods are connected with an auxiliary clip having a pair of horizontal flanges 8 and a central downward projecting member 9. The flanges 8 are caught under the spring clip 3 and are thereby held firmly in place. The auxiliary clip has lateral openings extending through it and through these openings in opposite directions pass the inner ends of the brace rods 7, 7, the inner end of each being provided with a nut. Between each of the nuts and member 9 there is interposed a coiled spring 11 whereby a resilient connection is made with the ends of the axle. The outer ends of these brace rods are connected securely to the axle.

As here shown, I provide a two part clamp each member 12 fitting at each side of the axle the two parts being united by a bolt 13 below the axle and a bolt 14 above the axle.

A lateral extension 15 is formed on each of the clamp members, this lateral extension fitting into the space on each side of the axle between the flanges so that the clamp holds firmly against any longitudinal pull. The clamping members extend upward forming a vertical extension which loosely embraces the edges of the spring near its end.

It will be seen from the construction of my device that any tendency of the body of the car or its spring to vibrate or sway laterally will be resisted by the springs 11 bringing the body back to its central position when it is thrown out of line without any shock. The result particularly in old cars where the springs are worn and bent down is a great improvement in the lateral steadiness of the car body and a consequent improvement of the action of the steering gear. A car that is cranky and uncertain in its steering and liable to shoot to one side unless carefully watched is converted by the application of my device into a steady car, the steering gear tending to remain in the center and to return to the center when turned to one side or the other. Not only is the car rendered more steady and reliable in steering by the use of my device but it is rendered much safer by means of the spring guide furnished by the two part clamps.

If desired, the brace rods may be used without the clamps, the outer ends being otherwise secured than as herein shown and other changes of detail may be made without departing from the spirit of my invention.

I claim:—

1. The herein described spring guard and anti-swaying device for automobiles of the class described consisting of a two part clamp embracing the axle and secured near each end thereof and loosely inclosing the spring, a clip secured on the central portion of the spring, a pair of rods connecting said clamp and said clip and a coiled spring on each rod for resisting the lateral movement of the spring in one direction.

2. The herein described combined spring guard and anti-swaying device for automobiles consisting of a two part clamp embracing the axle, and loosely inclosing the spring and secured to the axle near each end thereof, a clip secured on the central portion of the spring and having lateral openings, rods connecting with said clamps and extending through said openings and coiled springs on said rods for resisting the lateral movement of said springs in both directions.

3. The herein described combined spring guard and anti-swaying device for automobiles of the class described, consisting of a pair of two part clamps embracing the axle near each end and loosely inclosing the spring, a bolt extending through each clamp and crossing above the axle for securing the clamp near each end of the axle, a clip secured to the central portion of the spring and having lateral openings therein, a pair of rods extending in opposite directions through said openings and having eyes at their outer ends through which said bolts pass, the inner ends of said rods being provided with coiled springs for resisting the lateral motions of said spring.

4. The herein described anti-swaying device for automobiles of the class described, consisting of a clip secured to the central portion of the spring having lateral openings, a pair of rods extending through said openings, one rod toward each side of the automobile, the outer ends of said rods being secured to the axle and coiled springs on the inner ends of said rods for resisting the lateral movement of said spring and the attached parts.

In testimony whereof I have affixed my signature.

FRED L. ORDWAY.